United States Patent [19]

Lauver

[11] Patent Number: 4,495,339

[45] Date of Patent: Jan. 22, 1985

[54] CHEMICAL APPROACH FOR CONTROLLING NADIMIDE CURE TEMPERATURE AND RATE

[75] Inventor: Richard W. Lauver, Rocky River, Ohio

[73] Assignee: The United States of America as represented by the Administrator of the National Aeronautics and Space Administration, Washington, D.C.

[21] Appl. No.: 561,434

[22] Filed: Dec. 14, 1983

Related U.S. Application Data

[62] Division of Ser. No. 516,217, Jul. 22, 1983, abandoned.

[51] Int. Cl.³ .............................................. C08F 20/52
[52] U.S. Cl. ................................... 526/262; 526/204; 526/217; 528/314; 528/322
[58] Field of Search ................ 528/322, 314; 526/262, 526/204, 217

[56] References Cited

U.S. PATENT DOCUMENTS

| | | | |
|---|---|---|---|
| 3,179,634 | 4/1965 | Edwards | 260/78 |
| 3,565,549 | 2/1971 | Lubowitz et al. | 117/126 |
| 3,745,149 | 7/1973 | Serafini et al. | 260/65 |

*Primary Examiner*—Harold D. Anderson
*Attorney, Agent, or Firm*—Norman T. Musial; John R. Manning

[57] ABSTRACT

Polyimide resins suitable for use as composite matrix materials are formed by copolymerization of maleic and norbornenyl end-capped monomers and oligomers. The copolymers can be cured at temperatures under about 300° C. by controlling the available concentration of the maleic end-capped reactant. This control can be achieved by adding sufficient amounts of said maleic reactant, or by chemical modification of either copolymer, so as to either increase Diels-Alder retrogression of the norbornenyl-capped reactant and/or holding initiation and polymerization to a rate compatible with the availability of the maleic-capped reactant.

1 Claim, 1 Drawing Figure

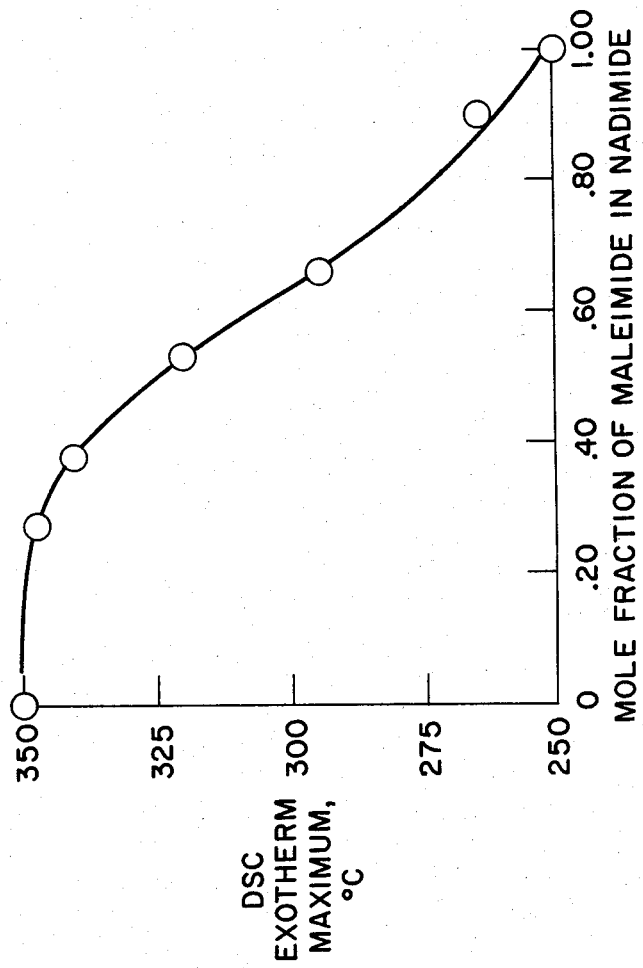

CHEMICAL APPROACH FOR CONTROLLING NADIMIDE CURE TEMPERATURE AND RATE

ORIGIN OF THE INVENTION

The invention described herein was made by an employee of the United States Government and may be manufactured and used by or for the Government for Governmental purposes without the payment of royalties thereon or therefor.

This is a division of application Ser. No. 516,217, filed July 22, 1983, now abandoned.

BACKGROUND OF THE INVENTION

1. Field of the Invention

This invention relates to polyimide resins which, because of their high thermal and oxidative stability and high strength at elevated temperatures, are useful in high temperature applications, including jet aircraft components, such as blades, seals, air splitters, and engine casing parts.

2. Description of Prior Art

Polyimide resins ae generally useful in applications requiring both high strength and high temperature capabilities, as where temperatures may reach up to approximately 550° F. (300° C.). Nevertheless, use of these polyimide resins has been limited by economic factors. In particular, a high energy expenditure is required to cure the polymer composition, and the preparation can be time consuming.

Addition cross-linking of high temperature polyimide polymers has, in the past, employed either norbornenyl (nadic) end-capped imide monomers or oligomers or maleic endcapped monomers or oligomers.

Norbornenyl-capped systems are typically cured at temperatures near 300° C. to give polymers able to function as matrix resins at use temperatures near 300° C. Attempts to modify the chemical reactions to reduce the cure temperature have succeeded in doing so, but only at the cost of lowering the ultimate use temperature of the final polymer. Thus, for example, maleic-capped systems exhibit more desirable cure temperatures (on the order of 200° to 275° C.). However, the resulting polymers cannot be used as matrix resins as sustained temperatures of 300° C.

Furthermore, thermally initiated copolymers of maleic anhydride (and derivatives thereof, such as maleimide) with a wide range of vinyl compounds (such as styrene, acrylonitrile, and methylmethacrylate) are known.

U.S. Pat. No. 3,745,149 to Serafini, et al., the disclosure of which is incorporated by reference herein, discloses a method for the preparation of polyimides from mixtures of monomeric diamines and esters of carboxylic acids. These starting materials may also be used in the practice of the present invention. As taught by this patent, macro-molecular polyimides are prepared from mixtures of monomers of (a) a dialkyl or tetra-alkyl ester of an aromatic tetracarboxylic acid, (b) an aromatic diamine, and (c) a monoalkyl or dialkyl ester of a dicarboxylic acid, wherein the ratio of (a):(b):(c) is $N:(N+1):2$, wherein N is an integer of from 1–20. These monomers are mixed in an organic solvent and comprise 30–70 percent by weight of the solution. The resulting solution of monomers has excellent long-term shelf life. These monomers are nonractive at room temperature, but react at elevated temperatures to form prepolymers, and when cured at high temperatures, form macromolecular polyimides having molecular weights of at least 10,000.

These polyimides have excellent high temperature oxidative and thermal stability and outstanding mechanical properties. However, their uses are limited by economic factors. In particular, the high energy input and time expenditure associated with the application of heat to raise the temperature to near 300° C. to effect the curing of the polymer, limits the use of the polyimides of this invention to very select applications.

U.S. Pat. Nos. 3,179,634 to Edwards and 3,565,549 to Lubowitz et al., also deal with end-capped prepolymers similar to those of the present invention.

BRIEF DESCRIPTION OF THE DRAWINGS

The single FIGURE illustrates the effect of maleimide concentration on cure temperatures of nadimide as measured by Differential Scanning Calorimetry.

SUMMARY OF THE INVENTION

The present invention permits the thermal cross-linking of polymeric materials which incorporate vinyl, particularly norbornenyl, and maleic functionalities in a manner which decreases the cross-linking initiation temperature (cure temperature) below approximately 300° C. as compared with state of the art norbornenyl-capped imide systems having higher cure temperatures. Having recognized that a major factor in the cure mechanism during the thermal polymerization of norbornenyl-capped imides involves the generation of maleic-capped imides (by Diels-Alder retrogression of norbornenyl imides) so as to provide a stoichiometric amount of maleic capped imide reactant relative to norbornenyl capped imide reactant followed by the subsequent thermally-initiated co-polymerization of the newly-formed maleic and remaining norbornenyl-capped imides, the invention controls the available concentration of the maleic-capped imide in any combination of one or more of three ways:

(1) by increasing the rate of Diels-Alder retrogression, which can be done by chemical modification;

(2) by decreasing the rates of initiation and polymerization through retardation of the free radical reaction by chemically varying the reactivity of the maleic reactant or the norbornenyl reactant or by adding a modifier to the system; and (3) by physically adjusting the concentration of the maleic-capped reactant to enhance the rates of initiation and polymerization.

Methods 1 and 3 result in an increased amount of maleic reactant, while method 2 retards the polymerization process so that sufficient maleic-capped reactant is available to permit the desired reactions to occur at a lower cure temperature.

DETAILED DESCRIPTION OF THE INVENTION

According to the process of the present invention, high temperature macromolecular polyimides are synthesized from a mixture of monomer compounds (as desribed in the U.S. Pat. No. 3,745,149 to Serafini, et al.) of the following formulae:

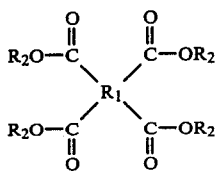

wherein $R_1$ is a tetravalent aryl radical and $R_2$ is alkyl, preferably lower alkyl of 1-4 carbon atoms, or hydrogen, at least two of $R_2$ being alkyl;

$$H_2N-R_3-NH_2 \quad (b)$$

wherein $R_3$ is a divalent aryl radical; and

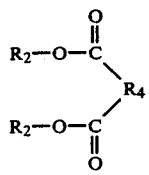

wherein $R_2$ is defined as (a) above, and wherein at least one of $R_2$ in (c) is alkyl, and $R_4$ is a divalent radical of the formulae:

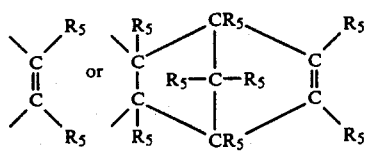

wherein $R_5$ is hydrogen or lower alkyl of 1-4 carbon atoms, and is preferably methyl.

The esters of the tetracarboylic acid defined in (a) above may be readily prepared according to known methods from the corresponding dianhydrides of the formula:

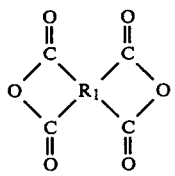

wherein $R_1$ is defined as above. Representative of the many dianhydrides which may be employed include pyromellitic dianhydride, 3,3',4,4'-benzophenone tetracarboxylic dianhydride, 2,2',3,3',-diphenyl tetracarboxylic dianhydride, bis (3,4-dicarboxyphenyl) sulfone dianhydride, 1,4,5,8-naphthalene tetracarboxylic dianhydride.

Examples of (a) include solid 2,5-dicarbomethoxyterephthalic acid, dimethyl ester of 3,3',4,4'-benzophenonetetracarboxylic acid, and dimethyl ester of pyromellitic acid.

Representative diamines of the type defined in (b) above, are benzidine, 4,4'-methylenedianiline, 4,4'-thiodianiline, 4,4'-oxadianiline, 4,4'-diaminodiphnyl sulfone, m-phenylenediamine, p-phenylenediamine.

The mono-dialkyl esters of the dicarboxylic acid defined in (c) may be prepared readily from the corresponding anhydride of the formula:

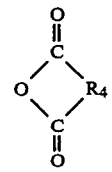

wherein $R_4$ is defined as above. Representative of such anhydrides include maleic anhydride, 5-norborene-2,3-dicarboxylic anhydride, methyl-5-norborene-2,3-dicarboxylic anhydride.

Examples of (c) include 5-norbornene-2,3-dicarboxylic acid monomethyl ester, and methyl-5-norbornene-2,3-dicarboxylic acid monomethyl ester.

An organic solvent is employed to dissolve the esters and diamine. The solvent is one which must not react with amines or esters during the processing conditions. Representative examples of suitable solvents are: N,N-dimethylformamide, N,N-dimethylacetamide, dimethylsulfoxide, N-methylpyrrolidone, aliphatic alcohols, aliphatic alcohol-ethers, and alkylbenzenes such as xylene. Mixtures of two or more such solvents may be employed. Compounds (a), (b), and (c) make up from 30 to 70 percent by weight of the resulting solution. The solution of (a), (b), and (c) can be stored until ready for use, the mixture being non-reactive at room temperature.

The solutions of mixtures of esters and diamine of the present invention may be reacted to form prepolymers of the types described in U.S. Pat. No. 3,528,950 by heating the solutions at temperatures of about 50° C. to 205° C. thereby forming low molecular weight end-capped prepolymers of the formula:

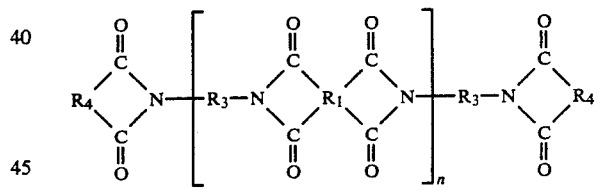

wherein $R_1$, $R_3$, $R_4$ and n are defined as above. The molecular weight of such end-capped prepolymers can be adjusted to desired values by varying the value of the number n between 1-20 provided that the molar ratio $nR_1$: $(n+1)R_3$:$2R_4$ is maintained, for the relationship of (a):(b):(c). The prepolymers have an average molecular weight in the range of 400-10,000.

As will be described in greater detail below, in one of the preferred embodiments of the method of the invention, suitable amounts of maleic end-capped prepolymers of the formula:

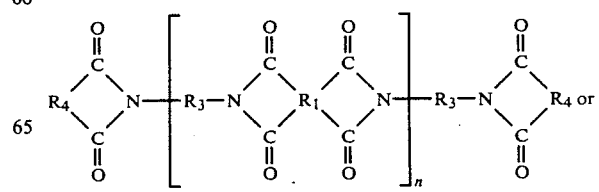

-continued

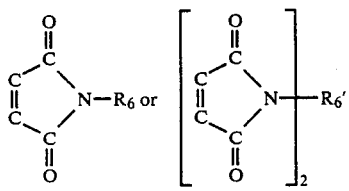

wherein R, R$_3$ and n are defined as above, and R$_4$ is defined by the formula:

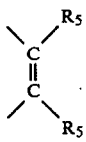

wherein R$_5$ is hydrogen, and wherein R$_6$ is an aromatic amine such as aniline and R$'_6$ is an aromatic diamine such as methylene dianiline, may be also added to the reaction mixture. However, it has been found that free amine contained in (b) above can react with the double bond in the maleic end-cap in a competitve and undesirable side reaction at the higher temperatures required for cure. To prevent this from occurring to an undesirable extent, most of the amine is first tied up by reacting (a), (b), and (c) at about 200° C. and 1 atmosphere pressure for approximately one hour. The maleic end-capped prepolymer can then be added to the resulting prepolymer produced by the reaction of (a), (b), and (c).

The maleic and/or norbornenyl end-capped prepolymers which react to form the polyimides of the invention, can be monomers or oligomers, or mixtures thereof. The term "reactant" shall be applied hereafter to cover all 3 possibilities.

According to the process of the present invention, the major factor in the generation of the maleic-capped imides of interest is Diels-Alder retrogression of norbornenyl imides to provide a stoichiometric amount of maleic end-capped prepolymer reactant relative to the norbornenyl end-capped prepolymer reactant and the subsequent thermally initiated co-polymerization of the newly-formed maleic imide reactant with remaining norbornenyl-capped imide reactant. The rates of initiation and polymerization are reflected in the onset temperature of the reaction and are determined by the concentration of the maleic-capped reactant. According to the process of the invention, the concentration of the maleic-capped reactant can be controlled by any combination of one or more of the three embodiments of the present invention.

The first embodiment involves increasing the rate of Diels-Alder retrogression. This is accomplished by various chemical modifications. Effective chemical modification of the copolymer reactants requires the replacement of hydrogen on a phenyl group in the copolymer molecule by one or more electronegative substitutients capable of having an electron-withdrawing effect on the electrons in the aromatic ring. The NO$_2$ group is an excellent electronegative substituent. The strong electron withdrawal caused by the nitro group or phenyl groups in the copolymer molecule results in an increased rate of Diels-Alder retrogression due to the effect of electron withdrawal effects on the imide ring of the molecule. The strong electron withdrawal effect also causes retardation of the initiation and polymerization reactions (discussed under the second embodiment below) due to the tendency of electron withdrawn phenyl groups to react with and stabilize radicals.

It is found that these effects can occur if the phenyl group has 1 or more hydrogen replacing electronegative substituents on it. NO$_2$, CN, halogens (i.e., fluorine, chlorine, bromine, iodine), and a wide variety of other electron-withdrawing substituents are effective for this purpose.

Among the specific NO$_2$ substituted norbornenyl capped imides found to be effective are the 2-, 3-, 4-, and 3,5—NO$_2$ phenylnadimides. Compounds with these substituents are observed to react at substantially lower temperatures, (as shown by Differential Scanning Calorimetry) than other norbornenyl-capped imides. Significant addition cross-linked reactivity is exhibited at temperatures near 200° C. with a maximum evolution of heat between 240° and 280° C.

The second embodiment relates to controlling the consumption of the maleic-capped imide reactant and involves decreasing the rates of initiation and polymerization through retardation of the free radical reaction. The purpose of this approach is to limit the consumption of the maleic reactant to a rate compatible with its production, which production occurs through Diels-Alder retrogression, as mentioned above. If the rates of initiation and polymerization are suitably controlled, the polymerization reaction will not be quenched by depletion of the maleic-capped imide reactant and the net reaction will actually be enhanced. The rate of initiation and polymerization can be controlled chemically varying the reactivity of the maleic reactant or the norbornenyl reactant (as discussed above). The reactivity of the maleic reactant is controlled in the same way as described in embodiment 1, above, for the norbornenyl reactant.

Alternatively, one may achieve the results desired through the second embodiment by adding a chemical modifier to the system. Among the modifiers found to be suitable are nitrobenzene, dinitrobenzene, isomers or chlorodinitrobenzene, isomers of nitrile substituted dinitrobenzene, and isomers of methyl substituted dinitrobenzene, but any substance with an aromatic ring having 1 or more electronegative substituents will be effective for this purpose.

The third embodiment of the invention involves controlling the concentration of the maleic-capped imide reactant and involves physically adjusting the concentration of the reactant to enhance the rates of initiation and polymerization. Instead of relying on the production of maleic capped reactant via Diels-Alder retrogression, one simply adds a suitable amount of maleic reactant to the imidized prepolymer produced by the reaction of (a), (b), and (c) (as discussed above) which may be any selected maleic-capped imide such as:

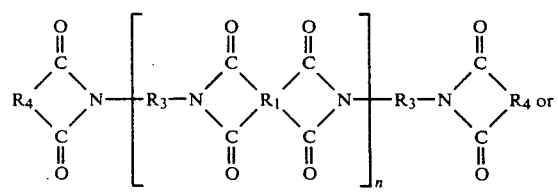

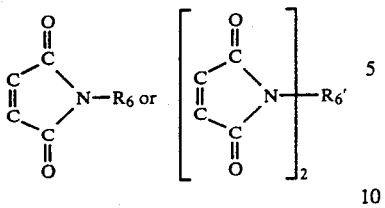

where the first example represents maleic reactant which may be chemically equivalent to the norbornenyl reactant of interest and where $R_1$, $R_3$ and n are defined as above, and where $R_4$ is represented by the first of the 2 formulae shown for $R_4$ above, and where $R_6$ is an aromatic amine such as aniline and $R'_6$ is an aromatic diamine such as methylene dianiline.

The effect of maleimide concentration on the peak exotherm temperature, and consequently on the cure temperature, of nadimide is shown in FIG. 1, in which the fraction of maleimide in nadamide is recorded on the abscissa, and the peak exotherm temperature on the Differential Scanning Calorimeter (D.S.C) is shown on the ordinate. As the mole fraction of maleimide in nadimide increases from 0 to 1.00, the peak exotherm temperature drops from approximately 350° to approximately 250° C. The results shown on this FIGURE were obtained with a bisnadimide of methylenedianiline, but any maleimide reactant would suffice to achieve similar effects.

The data presented by FIG. 1 also conversely show that, as one adds nadimide to an all-maleimide formulation, the peak exotherm temperature (and hence the cure temperature) increases. This concept can be useful in the polymerization of all maleimide systems. Addition of nadimide can increase the temperature input required and also slow down the polymerization. This slow-down may result in improvements in the quality of (mostly) maleimide preparations, though at a higher energy input.

By means of the three embodiments discussed above, the creation of the large molecular weight polyimide believed to have the following structure is achieved (the FIGURE, as used throughout the specification and the claims, does not attempt to account for the incorporation of evolved cyclopentadiene, but represents the idealized structure):

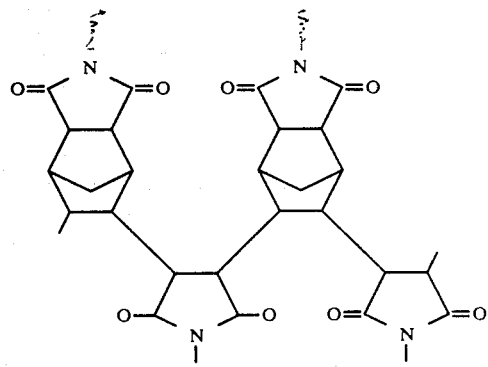

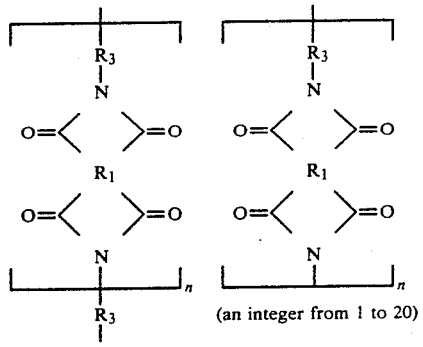

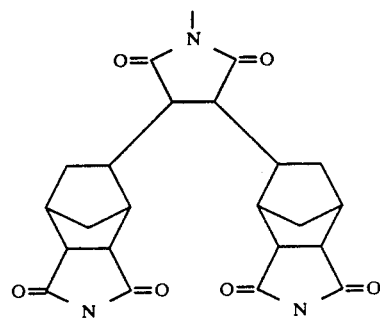

(an integer from 1 to 20)

wherein $R_1$ and $R_3$ and n are defined as above.

In addition to the use of $NO_2$ substituted phenyl groups, as discussed above, and applicable to embodiments 1 and 2, it is also found that any monomeric maleimide with a phenyl group attached to the nitrogen, and the phenyl group itself having hydrogen(s) substituted by any halogen, CN, or other electron withdrawing substitutients, can be effective to cause the necessary electron withdrawal to achieve the effects desired in embodiments 1 and 2.

A post-cure treatment (known to the art) is typically performed after the method of the invention is carried out. In the post-cure treatment, the temperature is typically raised to the anticipated use temperature of the polymer, i.e., 300° C. in the case of these polyimides.

EXAMPLES

EXAMPLE 1

As shown in FIG. 1, 0.49 mg. (approximately $1 \times 10^{-6}$ moles) of bisnadimide of methylene dianiline is mixed with 0.22 mg. (approximately $0.61 \times 10^{-6}$ moles) of bismaleimide of methylene dianiline. The mixture is heated, starting at ambient temperature, the temperature being increased 20° C. per minute towards 400° C. The cure exotherm (cure temperature) has onset near 250° C. and the peak exotherm occurs near 335° C.

EXAMPLE 2

To 1.77 mg. ($0.98 \times 10^{-6}$ moles) of PMR-15 resin in dry powder form (constituting 0.385 mg. nadic ester, 0.757 mg. of methyline dianiiine, and 0.582 mg of benzophenone tetracarboxylic acid) is added 0.11 mg. ($0.60 \times 10^{-6}$ moles) of 3,4 dinitrotoluene—a 38 mole percent fraction.

The mixture is heated as in Example 1. The cure exotherm (cure temperature) is observed to occur starting at 200° C., with peak exotherm occurring near 275° C.

EXAMPLE 3

The following series of nitro-substituted nadimides were observed to have the indicated cure onset temperature, and peak exotherm temperatures:

|  | Cure Onset Temp. | Peak Exotherm |
|---|---|---|
| A. 2-nitrophenyl nadimide | 200° C. | 275° C. |
| B. 3-nitrophenyl nadimide | 200° C. | 280° C. |
| C. 4-nitrophenyl nadimide | 200° C. | 272° C. |
| D. 3, 5-dinitrophenyl nadimide | 200° C. | 237° C. |

EXAMPLE 4

2.01 mg. ($4.1 \times 10^{-6}$ moles) of bisnadimide of methylene dianiline are mixed with 0.80 mg. ($1.5 \times 10^{-6}$ moles) of bis-4-nitrophthalic nadimide of methylene dianiline—a 27 percent mole fraction. The mixture is heat treated in the same manner as in Example 1. The cure onset (cure temperature) occurs at approximately 230° C. and the peak exotherm occurs at approximately 270° C.

Although the invention as thus far described has disclosed a number of specific formulations useful in the carrying out of the invention, it will readily be understood by those skilled in the art that other variations may be employed, and it is to be understood that the examples given shall in no way limit the scope of this invention.

What is claimed is:

1. A method of retarding the rate of polymerization in a maleimide prepolymer comprising the step of adding an effective amount of norbornenyl end-capped reactant, said effective amount being substantially less than 1.0 mole fraction relative to the maleimide.

* * * * *

UNITED STATES PATENT OFFICE
CERTIFICATE OF CORRECTION

Patent No. 4,495,339  Dated January 22, 1985

Inventor(s) Richard W. Lauver

It is certified that error appears in the above-identified patent and that said Letters Patent are hereby corrected as shown below:

On the title page:

[62] Division of Ser.No. 516,217,Jul. 22, 1983, abandoned.
should read
[62] Division of pending Ser. No. 516,217, July 22, 1983, which is a division of Ser. No. 404,809, Aug. 3, 1982, now U.S. Pat. No. 4,455,418.

Signed and Sealed this

Eighteenth Day of June 1985

[SEAL]

*Attest:*

DONALD J. QUIGG

*Attesting Officer*  *Acting Commissioner of Patents and Trademarks*